Patented Jan. 15, 1946

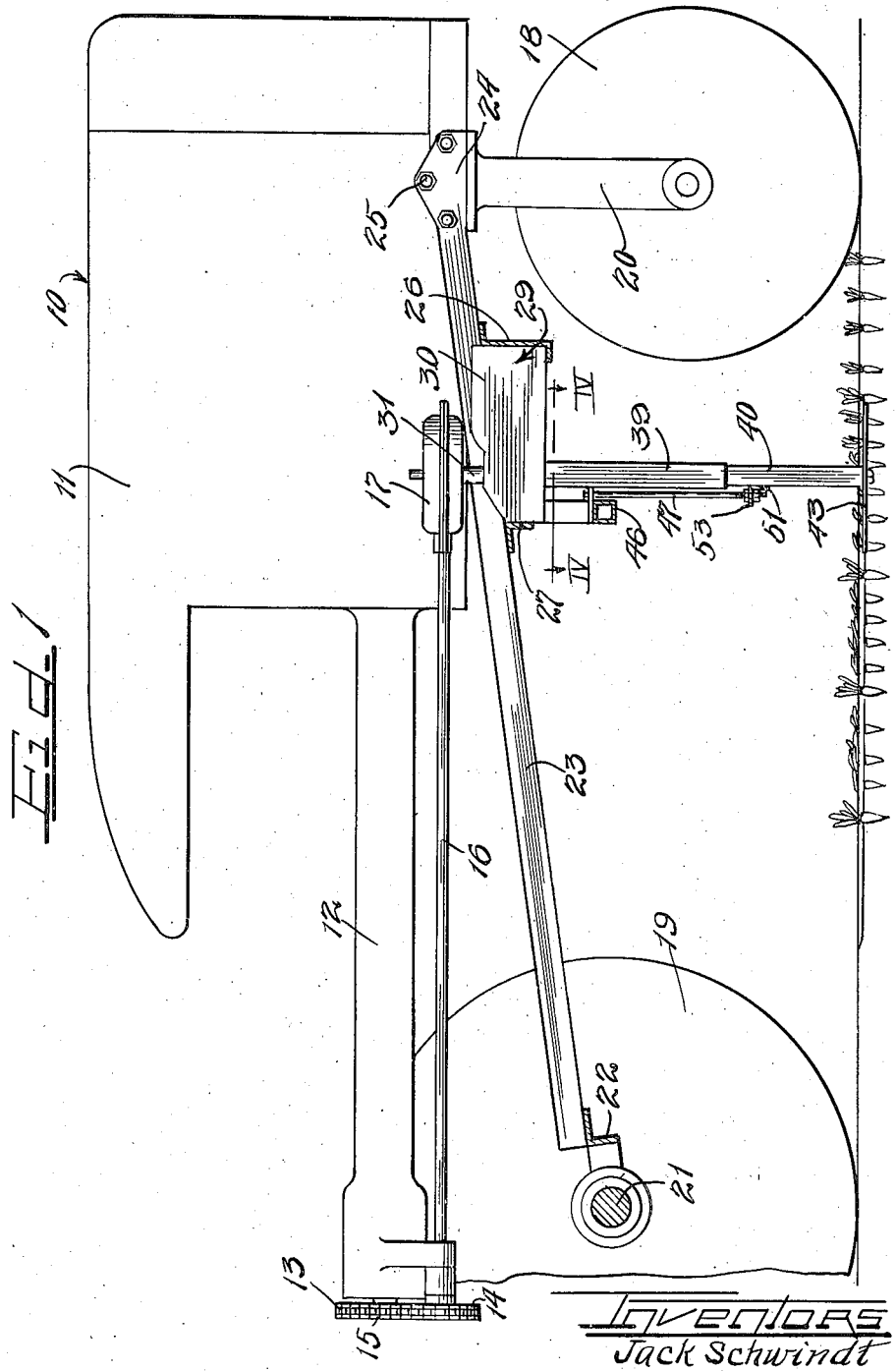

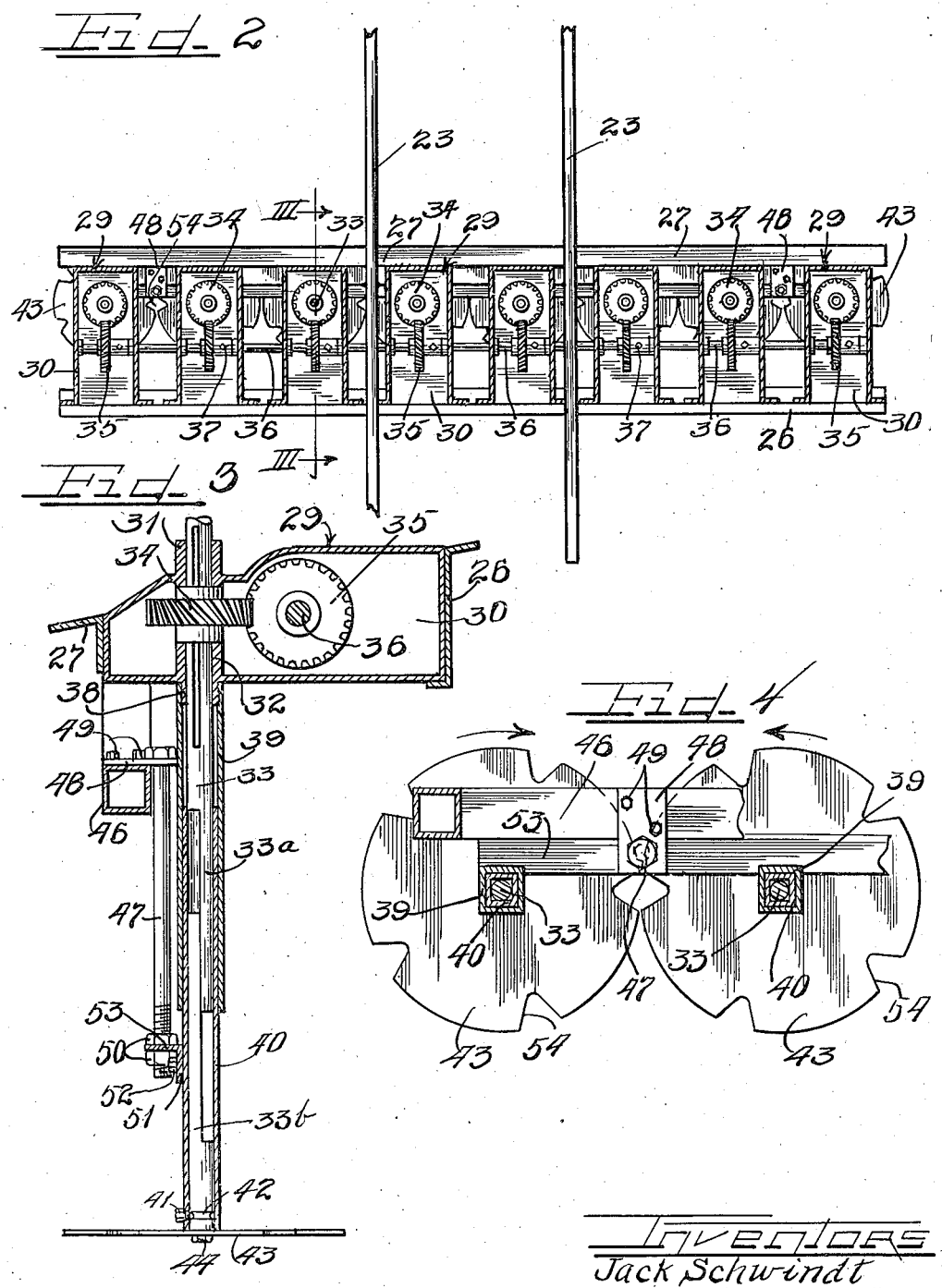

2,393,122

UNITED STATES PATENT OFFICE 2,393,122

BLOCKING AND THINNING OF SUGAR BEETS AND THE LIKE

Jack Schwindt and Frederick A. Trinkle, Fort Morgan, Colo.; said Schwindt assignor to said Trinkle Application July 30, 1943, Serial No. 496,710

3 Claims. (Cl. 97—17)

This invention relates to apparatus for blocking and thinning of produce while growing in the ground, being advantageously applied to such growing crops, for example, as sugar beets or the like. More particularly, the present invention is concerned with means for severing brush, weeds and certain of the beets or the like just under the surface of the ground to thin out the growth and provide adequate and substantially uniform spacing between plants to improve the cultivation and growing conditions therefor.

In the raising of sugar beets, to the cultivation of which the apparatus of the present invention is especially advantageously employed, it is customary to set the plants in rows but with the plants comprising each row spaced very closely together to insure complete rows from end to end. Obviously, if as frequently happens, all or nearly all of the beets grow, the rows are too crowded to afford satisfactory growing conditions. It is then the established practice to thin out the rows, a very tedious operation when done by hand.

This thinning or "blocking" operation as it is called is done by cutting out the brush, weeds and superfluous beet plants to leave sufficient space for proper growing between adjacent plants which remain after the blocking operation is completed.

It is also advantageous to provide substantially uniform spacing between the plants, if possible, to facilitate the topping and harvesting operations when the plants have completely matured. Thus, the job of thinning the beets is not only a very costly but also an exceedingly difficult and tedious operation when, as is usually necessary, the operation must be performed manually.

It is, therefore, the primary purpose of the present invention to provide means for accomplishing the thinning and blocking of sugar beets or the like with a minimum expenditure of manual labor and a maximum of efficiency.

It is a further object of the present invention to provide apparatus which will accomplish the thinning out of the plants quickly and uniformly without an excessive financial outlay for equipment.

The apparatus contemplated by the present invention operates to cut down and destroy the weeds and the intermediate plants in each of a plurality of rows at one and the same time thereby affording an additional saving in time and the amount of equipment required to accomplish the job.

Still another object of the present invention is to provide a means for loosening and at least partially working the ground surface between the standing plants as the weeds and superfluous plants are cut.

In accordance with the general features of our invention there is provided herein an apparatus for blocking and thinning of growing beets or like produce arranged in rows in the ground including means for cutting into the ground a fixed uniform distance below the surface thereof to sever the brush and the beets or the like at a point below the ground level for controlling the cutting whereby beets or the like at certain specified intervals will remain uncut while all of the brush and beets or the like therebetween will be destroyed.

Other objects and advantages of the invention will become apparent from the following description and accompanying drawings in which;

Figure 1 represents a side elevational view of one form of implement embodying the features of our invention;

Figure 2 is a fragmentary plan view of the apparatus with parts in section;

Figure 3 illustrates an enlarged vertical cross-section taken along the line III—III in Figure 2; and Figure 4 is an enlarged horizontal cross-section of a portion of the device of Figure 1 as seen from the line IV—IV therein.

It is to be understood that the embodiment shown and described herein is for illustrative purposes only and may be changed or modified without departing from the spirit and scope of the invention as set forth in the appended claims.

As best shown in Figure 1, the blocking and thinning implement embodying the invention may be conveniently attached to any suitable form of motive means such, for example, as a tractor 10 having a forward engine housing 11 and a rearwardly extending drive shaft housing 12 in the rear end of which is provided a suitable power take off. The power take off is shown as including a pair of sprockets 13 and 14 which are connected together in driving relation as by means of the chain 15. The sprocket 14 is mounted upon and adapted to actuate a drive shaft 16 extending substantially longitudinally of the tractor 10, being connected into and affording a means for operating the transmission unit 17.

The tractor 10 may be provided with front and rear wheels 18 and 19, respectively, a suitable supporting member 20 being provided to rotatably mount the front wheel 18 and an axle 21 being provided for the rear wheels 19. It will be understood that any suitable conventional driving connection may be provided between the motor disposed in the housing 11 and the wheels 19 for propelling the tractor 10.

Any of several different expedients may be utilized for securing the blocking and thinning assembly to the tractor 10 or other prime mover, the structure illustrated being employed only for purposes of illustration. This assembly includes a cross-bar 22 which may be supported from the rear axle 21 in any suitable fashion and inclined members 23 extending toward the front of the apparatus as a whole. The forward ends of the inclined members 23 may be provided with enlarged portions 24 which are adapted to receive a plurality of bolts 25 by means of which said inclined members 23 are secured to the side of the tractor 10.

The blocking and thinning mechanism may be supported upon the tractor 10, in the manner illustrated in Figure 1 by a supporting structure which advantageously includes the cross members 26 and 27 disposed horizontally of the apparatus and secured in any suitable fashion to the inclined members 23 transversely between the front and rear wheels 18 and 19 and preferably at substantially the center of mass of the tractor and under the engine housing 11. The complete assembly includes a plurality of actuating units 29 disposed in adjacent relation laterally of the machine.

Each unit 29 is provided with a housing 30 which serves to enclose the driving mechanism for each unit. Housings 30 are supported from the inclined members 23 by means of the cross members 26 and 27 to which they are secured. As will best be seen from Figure 3, the upper and lower walls of each housing 30 are provided with bosses 31 and 32, respectively. Bosses 31 and 32 are so disposed that they will receive and rotatably support vertical shafts 33.

A driving gear 34 is adapted to be mounted on each shaft 33 and be supported between said bosses 31 and 32. Driving gears 34 mesh with companion gears 35 all of which are adjustably secured to shaft 36 as by any suitable means such, for example, as set-screws 37. A clutch means (not shown) of any conventional design or construction may also be advantageously provided for engaging and disengaging gears 34 and 35, if desired. Alternatively, a suitable clutch may be employed to connect and disconnect the longitudinal shaft 16 to and from the power take off.

It will be apparent from Figure 3 that the lower boss 32 of each of the drive units 29 is provided with an exteriorly depending part 38 through which the shaft 33 extends. To part 38 is secured as by a press fit, or other suitable means, a depending tubular member 39 adapted to slidably receive a mounting member 40 which provides for the adjustable positioning of the blocking and thinning mechanism in a manner to be presently described in detail.

Each shaft 33 is provided with a splined portion disposed in the mounting member 40 made up of slidable segments 33a and 33b thereby permitting the shaft 33 to be extended in the manner illustrated in Figure 3 without, however, in the least affecting the positive operation of said shaft 33. The lower segment 33b of each shaft 33 has an annular groove 42 cut therein adjacent its lowermost end. The end of a stud bolt 41 threaded through the wall of mounting member 40 is adapted to register with the groove 42 so that the shaft 33 will be free to rotate but will be capable of being adjusted axially in conjunction with said member 40 which is slidably mounted in tubular member 39. A substantially circular disk-like knife blade 43 is secured to the lowermost extremity of segment 33b of each shaft 33 as by means of a bolt 44 threaded thereinto.

A laterally extending support 46 is provided in depending relation to the housings 30. To hold the vertical shafts 33 with their associated tubular members 39 and mounting members 40 in fixed relation to the driving mechanism while the machine is in operation, a plurality of adjustable stiffener members which may, for purposes of illustration, advantageously take the form of a pair of rods 47 are provided and are adapted to be mounted on support 46. Each of said rods 47 may have secured thereto adjacent one of its extremities a strap 48 which may be fixed, as by welding, brazing or the like, substantially at right angles to the axis of said rod 47.

Strap 48 is demountably attached to support 46 as by bolts 49 which extend through suitable apertures in said strap 48 and are advantageously threaded into said support 46. The other end of rod 47 may be threaded, as indicated, to receive a pair of nuts 50. A laterally extending angle 51 is secured to the mounting members 40 of the several units as by bolts 52 which are threaded into the walls of the members 40 in such a way as to prevent interference with shaft 33. The leg 53 of the angle 51 is apertured to receive the threaded ends of rods 47, one of the nuts 50 on each rod being disposed on either side of the projecting leg 53 so as to hold each mounting member 40 and its associated segment 33b of the shaft 33 in fixed position when adjusted as desired for the thinning operation.

Each knife blade 43 is provided with a plurality of substantially V-shaped notches 54 in equally spaced relation in the cutting edge thereof. It is contemplated that the notches 54 on each pair of blades 43 will register exactly as they are rotated in opposite directions by their respective shafts 33 as indicated by the arrows in Figure 4 of the drawings. The opposed rotation of the blades 43 is accomplished by employing the spiral gears 34 and 35 which are so cut that the desired direction of rotation of each knife blade will be achieved. This opposed rotation of each pair of blades 43 in the thinning operation causes the dirt, severed beets and weeds to be cast to the rear thereby preventing obstruction to the blades 43 in the forward motion of the apparatus.

The drive for the several shafts 33 is advantageously provided by extending one or more (one in the illustrated apparatus) of the shafts 33 through its upper boss 31 in one of the housings 30 into the transmission unit 17. Said transmission unit 17 embodies conventional gearing suitable to transmit power from drive shaft 16 to the said shaft 33 extending thereinto.

The gear 34 on this single extended shaft 33 (which is shown as being the third from the left in Figure 2) actuates the common laterally extending shaft 36 through the companion gear 35. Shaft 36 through the intermeshing of the remaining companion gears 34 and 35 drives the several remaining vertical shafts 33.

It will, of course, be understood that the rotation of each pair of the shafts 33 must be in properly timed relation so that the notches 54 in blades 43 will register at the required intervals.

By virtue of the unitary driving arrangement of the present apparatus, once the notches 54 are registered properly they will need no further adjustment until the operation is completed. The adjustment of the shafts 33 with respect to shaft 36 may be accomplished by loosening set-screws 37 and rotating the shafts 33 into position before again tightening said set-screws 37.

Moreover, the operation of the blades 43 must also be timed with respect to the speed of movement of the tractor 10. This relationship is essential to provide the desired spacing between the plants in each row. The speed of operation can be readily determined for the motive power, in this case, tractor 10 to give the desired results. The cutting of the gears 34 and 35 will determine the speed of rotation of the knives and if the optimum speed of the tractor is once determined by trial, the operation of the unit can be rendered uniform.

In operation, the machine is driven to the field of growing beets or the like and the apparatus positioned in the direction of the rows. The knife blades 43 are advantageously set to cut slightly, for instance, one-half to one inch, below the actual surface of the ground. This adjustment is effected through the lowering of each mounting member 40 and associated segment 33b of shaft 33 slidably mounted in tubular member 39 in which position it is fixed by the tightening of nuts 50 against the faces of leg 53 of the angle 51.

After each of the blades 43 is vertically adjusted and arranged so that the notches 54 for each pair of blades register at the proper intervals, the tractor 10 is started along the beet rows. Since the machine is provided with four pairs of cooperating knife blades 43, it is adapted to thin four parallel rows at one and the same time. Any desired number of pairs of units may be operatively associated, the present number having been chosen for the sake of convenience.

It will be understood that as the machine moves along the rows of beets, those cutting portions of the knife blades 43 cooperate to cut through the ground and sever the plants and weeds. When, however, the notches 53 register about a plant, that one will remain uncut. By virtue of the closeness of the plantings, a number of intermediate plants will be cut off at, or slightly below, the ground level while at regular intervals a single plant will remain thus insuring a substantially regular spacing between the uncut plants in the rows.

The particular location of the topping cutter unit under the tractor imposes the weight of the tractor vertically and downwardly through the telescopically related shaft housing members 39 and 40, whereby to maintain the blocking blades effectually uniformly below the surface of the ground. In addition, the adjusting rod means 47 affords adequate thrust reinforcement for the lower extension or mounting member 40 to prevent the blocking blades from being thrust out of the ground.

After the completion of the thinning operation, the rods 47 and angles 51 may readily be dismounted from the respective parts of the apparatus. The unit with the addition of other suitable equipment may then be employed in other operations associated with crop handling such as, for example, as topping and harvesting steps, if desired.

It will, of course, be understood that various details of construction and operation may be varied through a wide range without departing from the principles of this invention and it is, therefore, not the purpose to limit the patent granted hereon otherwise than necessitated by the scope of the appended claims.

We claim as our invention:

1. Apparatus for mounting on a vehicle for blocking and thinning of growing sugar beets or like produce, comprising a spaced parallel pair of upper stationary frame parts depending vertically from the vehicle body in a plane transverse of the vehicle, lower frame parts telescopingly engaging in said upper frame parts, a drive shaft segment in each of said lower frame parts rotatable therein and axially movable therewith, a cutter disk secured to the lower end of each shaft, means for setting said lower frame parts to hold said disks in a common horizontal plane with their peripheral edges opposed and with the disks engageable a distance below the surface of the ground over which the vehicle travels, power means for rotating said shaft segments and disks at the same speed and in opposite direction whereby beets will be received between the cutting disks for sufficient cutting away of the tops thereof to block further growth, said disks having notches adjacent to their peripheries spaced so that notches of the disks will periodically register to leave clearance space for beets which are to remain uncut, said power means including drive shaft segments non-axially but rotatably movable in said upper frame parts and having sliding coupling with the shaft segments in said lower frame parts.

2. In combination in an attachment for an agricultural tractor, a support frame structure to be secured transversely under the tractor body between the front and rear wheels thereof, a fixed pair of upper vertically depending spaced parallel tubular members rigid with said frame structure and adapted to extend down to within a substantially spaced distance from the ground in which the attachment is to operate, a respective tubular lower mounting member cooperating telescopically for protraction and retraction with each of said upper depending members and serving as an extension thereof to the ground, the telescopically related upper and lower members providing vertical shaft housings, a drive shaft in each of said housings comprising upper and lower longitudinally slidingly coupled portions respectively disposed rotatably within and extensible and retractable with the upper and lower members, means carried by the frame structure for driving said shafts rotatably in coordination, the lower ends of the lower drive shaft portions projecting below the lower ends of the respective lower mounting members, notched rotary blocking blades carried by the projecting shaft ends and cooperatively related to cut below the surface of the ground along a beet row in the advance of the attachment therealong by the tractor for destroying all plants except spaced beet plants in the row selected by the notched blades, and means for reinforcing said lower mounting members and for adjusting them telescopically to determine the depth at which the blades will operate below the ground surface.

3. In combination with a tractor including a forward engine housing and supported by substantially spaced front and rear wheels, the front wheel or wheels being at substantially the forward end of the engine housing, a supporting frame structure secured transversely under the engine housing rearwardly of the front wheel and having a fixed pair of vertically depending spaced parallel tubular members rigid therewith and extending to within a substantially spaced distance from the traction plane of the wheels, respective tubular shaft housing members cooperating telescopically in protractible and retractable relation with each of said depending members and providing coaxial shaft housing extensions therefor, a drive shaft in each of said housings comprising upper and lower longitudinally slidingly coupled portions respectively disposed rotatably within and extensible and retractable with the respective telescopically related members, means for driving said shafts in coordination, the lower ends of the lower drive shaft portions projecting below the lower ends of the respective associated lower extension members and having notched rotary blocking blades thereon cooperatively related to cut below the surface of the ground along a beet row along which the tractor is propelled for destroying all plants except selected spaced beet plants in the row as determined by the notches in the blades, the location of the telescopically related members below the engine housing imposing the weight of the tractor and the engine thereof vertically downwardly through said telescoped members whereby effectually to maintain the blocking blades uniformly below the surface of the ground, and means for vertically adjusting the lower extension members to establish the depth of operation of the blades and for providing thrust reinforcement for the lower extension members to prevent the blocking blades from being thrust out of the ground.

JACK SCHWINDT.
FREDERICK A. TRINKLE.